US012710272B2

(12) United States Patent
Ramirez Llanos et al.

(10) Patent No.: US 12,710,272 B2
(45) Date of Patent: Aug. 18, 2026

(54) GROUND VEHICLE MONOCULAR VISUAL-INERTIAL ODOMETRY VIA LOCALLY FLAT CONSTRAINTS

(71) Applicant: AUMOVIO Autonomous Mobility US, LLC, Auburn Hills, MI (US)

(72) Inventors: Eduardo Jose Ramirez Llanos, Rochester Hills, MI (US); Xin Yu, Auburn, MI (US); Dhiren Verma, Rochester Hills, MI (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 1104 days.

(21) Appl. No.: 17/134,969

(22) Filed: Dec. 28, 2020

(65) Prior Publication Data

US 2022/0205788 A1 Jun. 30, 2022

(51) Int. Cl.

*G05D 1/02* (2020.01)
*B60R 11/04* (2006.01)
*G01C 21/16* (2006.01)
*G06F 18/25* (2023.01)
*G06T 7/73* (2017.01)

(52) U.S. Cl.

CPC .......... *G01C 21/1656* (2020.08); *B60R 11/04* (2013.01); *G06F 18/253* (2023.01); *G06T 7/73* (2017.01); *B60R 2300/108* (2013.01); *G06T 2207/30252* (2013.01)

(58) Field of Classification Search

CPC .................. G01C 21/1656; G06T 7/73; G06T 2207/30252; G06F 18/253; B60R 11/04; B60R 2300/108

See application file for complete search history.

(56) References Cited

U.S. PATENT DOCUMENTS 9,148,650 B2 9/2015 Chandraker et al.
11,199,415 B2 * 12/2021 Omari .................... G01C 21/30
11,340,079 B1 * 5/2022 Ebrahimi Afrouzi ........................ G01C 21/188
2016/0140729 A1 5/2016 Soatto et al.
(Continued)

FOREIGN PATENT DOCUMENTS

CN 110100151 A 8/2019

OTHER PUBLICATIONS

K. J. Wu et al., "Yins on wheels," in IEEE International Conference on Robotics and Automation (ICRA), 2017.
(Continued)

*Primary Examiner* — Adam M Alharbi

(57) ABSTRACT

A method of visual-inertial odometry for a ground vehicle is disclosed and includes obtaining an initial set of images with a camera on-board a vehicle, identifying features within the initial set of images, determining a three-dimensional pose using the visual features in the initial set of images, obtaining information indicative of vehicle movement with an inertial measurement unit, obtaining information indicative of vehicle movement with wheel speed sensors and a steering wheel angle sensor, fusing the identified features within the images, the vehicle movement from the IMU, and vehicle sensors within a two-dimensional plane, and determining a vehicle position relative to an initial start location based on the visual features in the images and the vehicle movement information from the IMU, wheel speed sensors, and the steering wheel angle.

19 Claims, 4 Drawing Sheets

(56) References Cited

U.S. PATENT DOCUMENTS

2018/0073891 A1* 3/2018 Max .................... B62D 15/021
2018/0188032 A1 7/2018 Ramanandan et al.
2018/0190046 A1 7/2018 Levinson et al.
2019/0033466 A1 1/2019 Palella et al.
2019/0146500 A1 5/2019 Yalla et al.
2019/0323845 A1 10/2019 Agarwal et al.
2019/0368879 A1* 12/2019 Roumeliotis ........... G07C 5/08
2020/0285863 A1* 9/2020 Sadjadi .................... G06T 7/73
2020/0298836 A1* 9/2020 Kim ................... B60W 40/105
2021/0354725 A1* 11/2021 King .................... B60W 40/06
2022/0187841 A1* 6/2022 Ebrahimi Afrouzi ........................ G05D 1/0274
2023/0117498 A1* 4/2023 Alcantarilla .......... G06V 10/44 382/103

OTHER PUBLICATIONS

S. Shen et al., "Tightly-coupled monocular visual-inertial fusion for autonomous flight of rotorcraft MA Vs," in 2015 IEEE International Conference on Robotics and Automation (ICRA), 2015.

* cited by examiner

GROUND VEHICLE MONOCULAR VISUAL-INERTIAL ODOMETRY VIA LOCALLY FLAT CONSTRAINTS

TECHNICAL FIELD

The present disclosure relates to an autonomous driving system and more particularly to improvements in visual-inertial odometry systems.

BACKGROUND

Autonomously operated vehicles continually gather and update information for determining a position and orientation of the vehicle over time. Visual-inertial odometry for ground vehicles uses images captured by cameras on the vehicle to determine position and orientation of the vehicle. Visual-inertial odometry may model motion as two-dimensional or three-dimensional, three or six degree-of-freedom, respectively. Each method has its advantages. However, both methods can require significant processor capability.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of visual-inertial odometry for a ground vehicle according to an exemplary embodiment of this disclosure includes, among other possible things, obtaining an initial set of images with a camera on-board a vehicle, identifying features within the initial set of images, determining a three-dimensional pose using the visual features in the initial set of images, obtaining information indicative of vehicle movement with an inertial measurement unit, obtaining information indicative of vehicle movement with wheel speed sensors and a steering wheel angle sensor, fusing the identified features within the images, the vehicle movement from the IMU, and vehicle sensors within a two-dimensional plane, and determining a vehicle position relative to an initial start location based on the visual features in the images and the vehicle movement information from the IMU, wheel speed sensors, and the steering wheel angle.

In another example embodiment of the foregoing method of vehicle-visual-inertial odometry, the alignment of images poses is constrained to the two-dimensional plane.

Another example embodiment of any of the foregoing methods of vehicle-visual-inertial odometry, further includes fusing vehicle speed information from wheel speed sensors with the visual features from the camera's images.

Another example embodiment of any of the foregoing methods of vehicle-visual-inertial odometry, further includes fusing a steering wheel angle from an angle sensor with the visual features from the camera's images.

In another example embodiment of any of the foregoing methods of vehicle-visual-inertial odometry, the fusing of the poses coming from the identified features is within a common plane between two or more consecutive images.

In another example embodiment of any of the foregoing methods of vehicle-visual-inertial odometry, vehicle acceleration and orientation data obtained from the IMU is gathered at a rate higher than that of the rate that the camera captures images.

In another example embodiment of any of the foregoing methods of vehicle-visual-inertial odometry, the images of the camera are optimized according to a sliding window based optimization.

In another example embodiment of any of the foregoing methods of vehicle-visual-inertial odometry, the sliding window based optimization is constrained between any two images as a locally flat movement.

In another example embodiment of any of the foregoing methods of vehicle-visual-inertial odometry, the poses are transformed to match an IMU reference frame.

In another example embodiment of any of the foregoing methods of vehicle-visual-inertial odometry, motion between images is constrained to provide a best fit of a plurality of sampled points from the IMU and wheel speed sensors, and steering wheel angle sensor.

A vehicle-visual-inertial odometry system for a ground vehicle according to another exemplary embodiment of this disclosure includes, among other possible things, at least one camera on-board the vehicle obtaining images of object proximate the vehicle, an inertial measurement unit generating information indicative of vehicle movement, a wheel speed sensor generating information indicative of wheel speed and a controller configured to obtain an initial set of images with a camera on-board a vehicle; identify visual features within the initial set of images, obtain information indicative of vehicle movement with an inertial measurement unit, obtain information indicative of vehicle movement with the vehicle's wheel speed sensors and steering wheel angle sensor, determine a two dimensional plane between the visual features in a sliding window and for a plurality of sampled points from the IMU, wheel speed sensors, and steering wheel angle; fuse the identified features within the images and the vehicle movement from the IMU and vehicle sensors within the two-dimensional plane, and determine a vehicle position relative to an initial start location based on the visual features in the images and the vehicle movement information from the IMU and vehicle sensors.

In another example embodiment of the foregoing vehicle-visual-inertial odometry system, the controller is further configured align the poses coming from the visual features in the two-dimensional plane.

In another example embodiment of any of the foregoing vehicle-visual-inertial odometry systems, a wheel speed sensor obtains information indicative of a vehicle speed and the controller is further configured to fuse the vehicle speed information from the wheel speed sensor with the information coming from the camera's images.

In another example embodiment of any of the foregoing vehicle-visual-inertial odometry systems, a steering angle sensor provides an angle of the steering and the controller is configured to fuse the steering angle with the information coming from the camera's images.

In another example embodiment of any of the foregoing vehicle-visual-inertial odometry systems, the controller is configured to constraint the solution of the odometry system by the identification of a common plane for the visual features, the IMU, and the vehicle information between two consecutive images.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
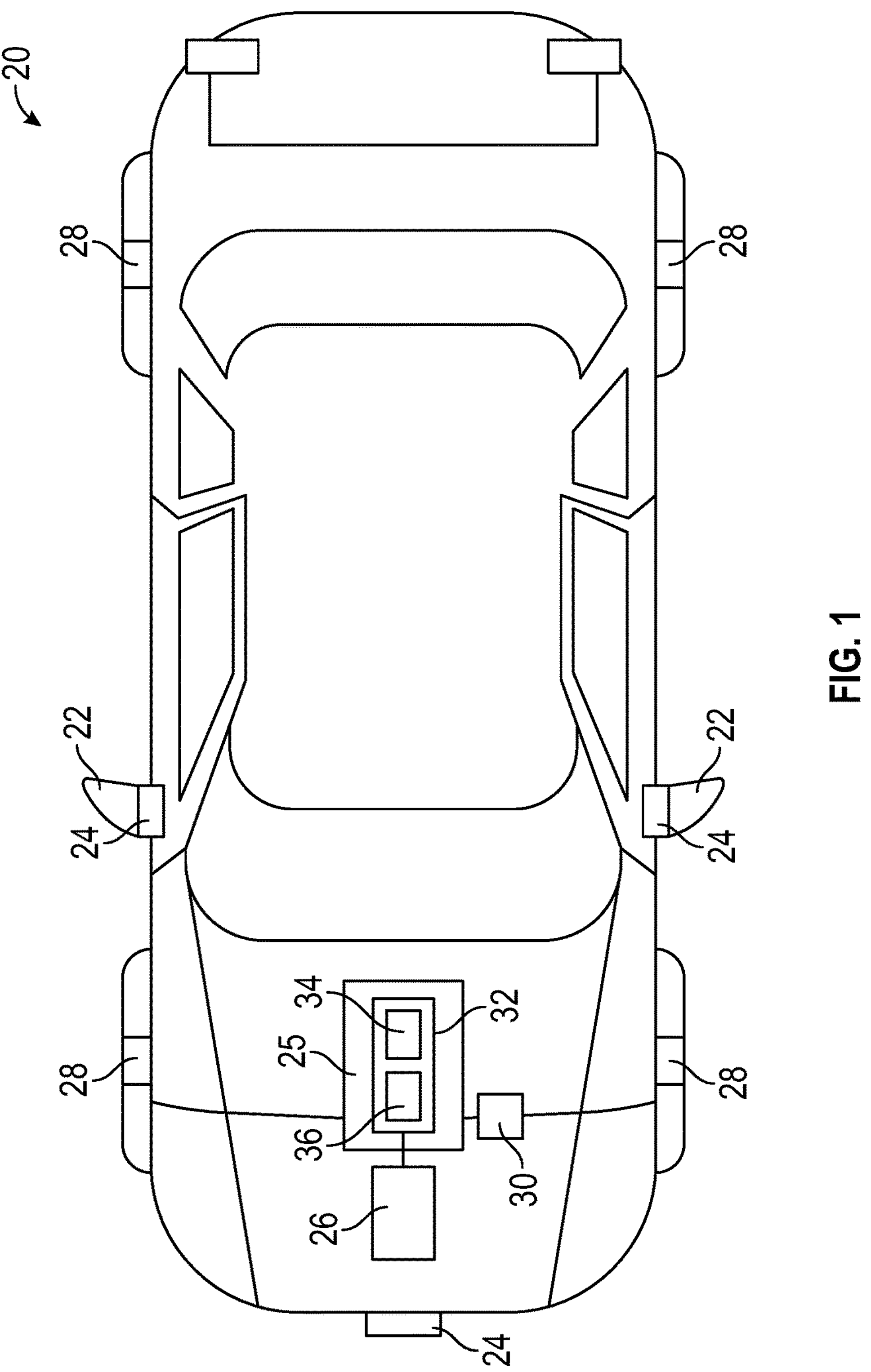
FIG. 1 is a schematic view of a vehicle including a visual-inertial odometry system.

Referring to FIG. 1, a vehicle 20 includes cameras 24 disposed at side mirrors 22 and at a front of the vehicle that capture images for a visual-inertial odometry system 25. The visual-inertial odometry system 25 utilizes images in combination with other vehicle sensor systems to locate the vehicle with a local coordinate system. The vehicle 20 includes an inertial measurement unit 26, wheel speed sensors 28 and a steering angle sensor 30 that generate information fused with the images captured from the cameras 24. The vehicle further includes a controller 32 including a processing device 34 and a memory device 36 that are configured to obtain the odometry of the vehicle 20 based on a disclosed example algorithm.

The disclosed visual-inertial odometry system 25 operates according to an example disclosed algorithm that captures visual features from a group of images and fuses the features with acceleration and orientation information from the IMU 26, wheel speed sensors 28 and the steering angle sensor 30. By fusing this information, we provide a tightly-coupled optimization framework to output the odometry of the vehicle 20.

Figures 2, 3:
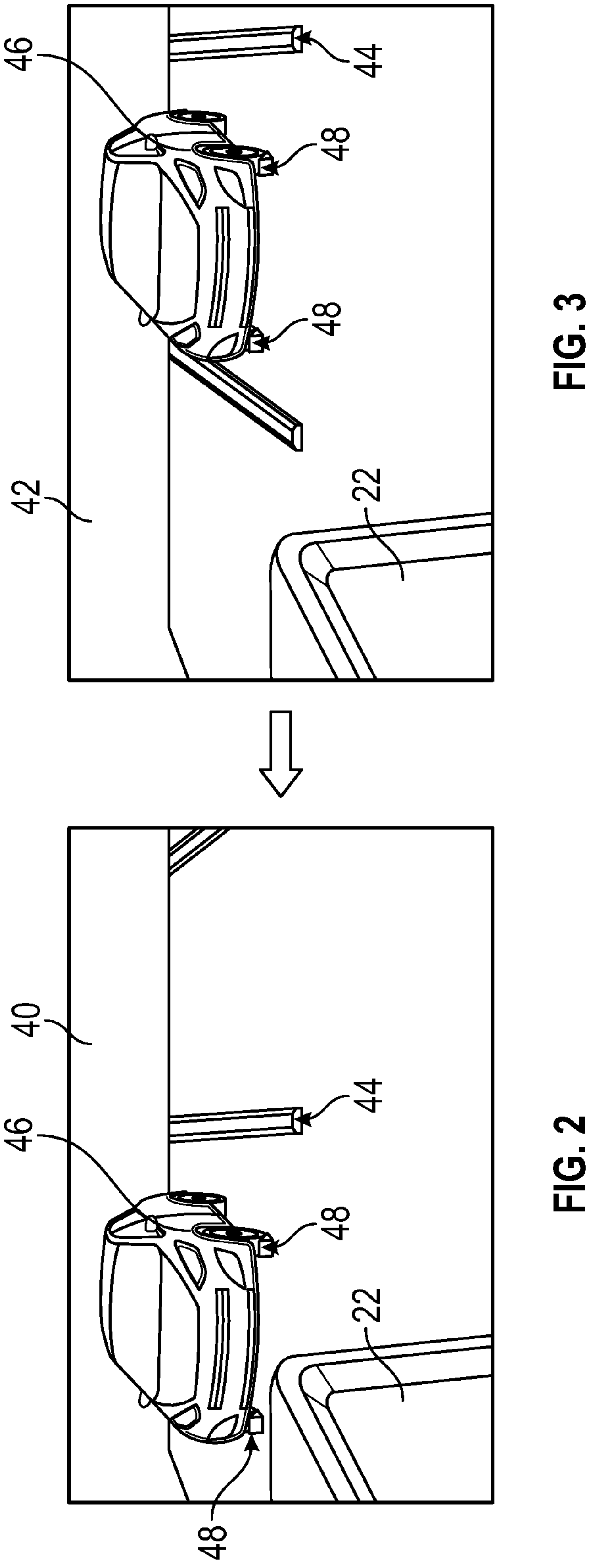
FIG. 2 is a schematic view of a first image captured from a camera on-board the vehicle at a first time.
FIG. 3 is a schematic view of a second image capture from the camera on-board the vehicle at a second time.

Referring to FIGS. 2 and 3 with continued reference to FIG. 1, the system 25 captures images a group of images and identifies features in each of the figures. The features are tracked across the different images to determine a relative location of the vehicle. For example, in a first image 40 (FIG. 2) features 44 and 46 are identified by edges or corners. In this example, the vehicle 46 is identified as a feature by edges 48. A parking space marker is identified by an edge 44. These same features are identified in a second image 42 (FIG. 3) that is taken at a time after the first image. The difference in location of each of the features 46, 44 is utilized to determined movement of the vehicle 20 within that period of time between the images 40, 42. As appreciated, although two images are utilized by way of example, many images and many features are tracked across those images to provide greater accuracy and confidence.

The example system tracks the features across the images 40, 42 utilizing an example sliding window based optimization described by the equation:

$$\min_X (b_{prior} - \Lambda_{prior} X) + \sum_{k \in D} \left\| r_D\left(\hat{z}_{k+1}^k, X\right) \right\|_{P_{k+1}^k}^2 + \sum_{(l,j) \in C} \rho\left( \left\| r_c\left(\hat{z}_l^j, X\right) \right\|_{P_j^l}^2 \right) := f(X). \quad \text{Equation 1}$$

A sliding window based optimization fuses information from the IMU together with the visual features in the images. Equation 1 supposes all sensors are referenced to a common coordinate systems. In equation 1

$$X = \left[x_0, x_1, \ldots, x_n, x_c^b, \lambda_0, \lambda_1, \ldots, \lambda_m\right], x_k = [p_k, v_k, q_k], k \in [0, n],$$

are the camera state at time kth that consists of the pose and velocity with respect the first camera pose or image (or world frame denoted as $(\bullet)^w$);

n is the total number of camera frames in the sliding window;

m is the total number of features in the sliding window;

$[b_{prior}, \Lambda_{prior}]$ is the prior information from marginalization;

$$x_c^b = \left[p_c^b, q_c^b\right]$$

is the extrinsic from the IMU frame to the camera frame;

$\lambda_l$ is the lth point feature distance from its first observation;

$$\hat{z}_{k+1}^k$$

is the pre-integrated measurements from the IMU between the images k and k+1;

$$r_D\left(\hat{z}_{k+1}^k, X\right)$$

is the loss function for the IMU;

D is the set of indices of the set of the IMU frames in the sliding window;

$$P_{k+1}^k$$

is the measurement covariance matrix for the IMU;

ρ: R→R is the Huber norm;

$$\hat{z}_l^j$$

is the visual measurement;

$$r_C\left(\hat{z}_l^j, X\right)$$

is the loss function for the visual features;

$$P_j^l$$

is the visual feature measurement covariance matrix; and

C are the indices of the set of image features of the sliding window such that (l, j)∈C means the feature lth of the image jth.

The sliding window based optimization described by equation 1 above uses only the information from the IMU 26 and visual features captured from the images to obtain the odometry of the ground vehicle 20. The example disclosed algorithm further incorporates additional vehicle sensor information by solving the optimization problem described in Equation 2:

$$\min_X f(X) + f_O(X) \quad \text{s.t. } g_k(X) = 0, \forall k \in [0, n], \qquad \text{Equation 2}$$

In Equation 2, $f_O(X)$ is the loss function due to the vehicle model and $g_k(X)$ constraints the solution to a locally flat movement between 2 camera images. All measurements in the vehicle are pre-integrated on two consecutive image frames, k and k+1. All measurements are further transformed to the IMU frame. We define $$\hat{\lambda}_{k+1}^k$$

for the pre-integration of the position, $$\hat{\beta}_{k+1}^k$$

for the pre-integration of the speed, and $$\hat{\gamma}_{k+1}^k$$

for the pre-integration of the yaw angle in the IMU frame. The three last variables are pre-integrated within the sliding window according to a predefined vehicle model, such as for example a bicycle model.

The example algorithm utilizes the following augmented loss function $f_O$ that incorporates the vehicle information in the loss function as shown in Equation 3 and 4 below.

$$f_O(X) = \sum_{k \in O} \left\| r_O(\hat{z}_{k+1}^k, X) \right\|_{P_{k+1}^k}^2, \qquad \text{Equation 3.}$$

$$r_O(\hat{z}_{k+1}^k, X) = \begin{bmatrix} R_w^{b_k}(p_{b_{k+1}}^w - p_{b_k}^w - v_{b_k}^w \Delta_{t_k}) - \hat{\lambda}_{k+1}^k \\ R_w^{b_k}(v_{b_{k+1}}^w - v_{b_k}^w) - \hat{\beta}_{k+1}^k \\ 2\left[\zeta_{b_k}^{w^{-1}} \otimes \zeta_{b_k}^w \otimes \hat{\gamma}_{k+1}^k\right]_{xyz} \end{bmatrix}, \qquad \text{Equation 4.}$$

In Equation 4, 0 contains all indices of the set of the vehicle information frames in the sliding window, $$r_O(\hat{z}_{k+1}^k, X)$$

is the loss function for the vehicle model, $$\hat{z}_{k+1}^k$$

is the is the pre-integrated measurements from the vehicle measurements, $$P_{k+1}^k$$

is the covariance matrix according to the chosen vehicle dynamics, $$R_w^{b_k}$$

is the incremental rotation matrix of the world frame at time k-th to the IMU body frame, $\Delta_{t_k}$ is the time interval between the two images frames k and k+1, the notation $$(\cdot)_{b_k}^w$$

denotes the variable in the IMU body frame at time k with respect to the world frame, ζ is the quaternion that describes the yaw angle from body to world (roll and pitch are zero since the vehicle is assumed to follow a locally flat movement on the plane), ⊗ is the multiplication operation between quaternions, and $[\bullet]_{xyz}$ extracts the vector part of the quaternion operation.

Recall that the function $g_k$ constraints the optimization problem to a locally flat movement in the sliding window. The function $g_k$ takes the form of a linear constraint $A^T p_{D_k}$, where A is the vector of coefficients for the plane and $p_{D_k}$=

$$[(p_{b_k}^w)^T, 1]^T$$

for k∈[0, n]. Notice that more complex functions of $g_k$ might be defined, but we focus on the linear one. To find the value of A, at least three samples are taken from the IMU pre-integrated position $$\hat{\lambda}_{k+1}^k.$$

Figure 4:
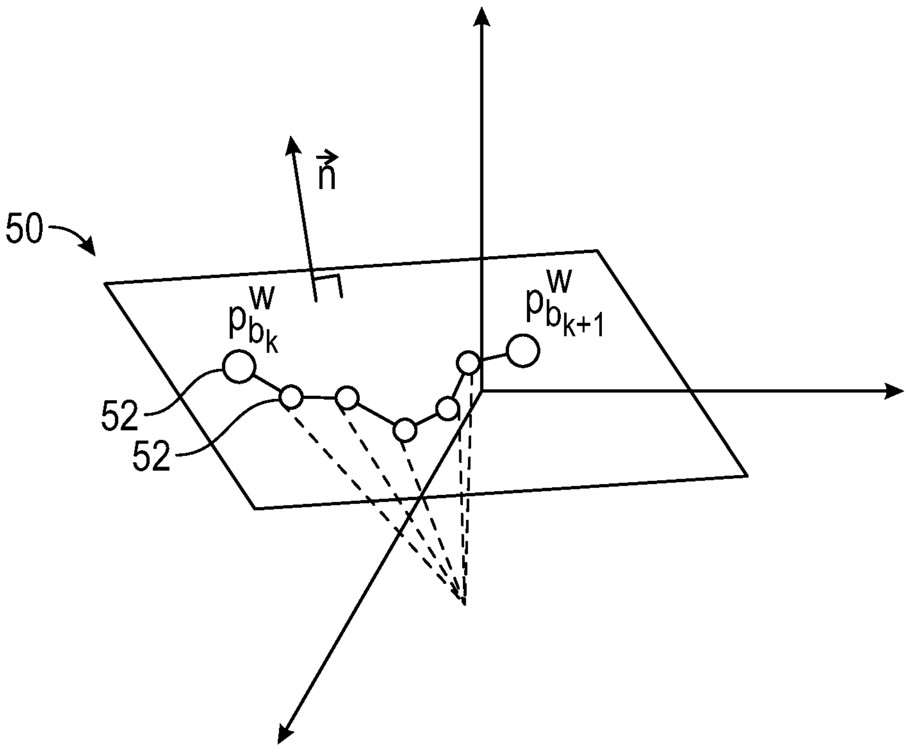
FIG. 4 is a schematic view of a plane determined based on points obtained from images captured from the camera on-board the vehicle according to one example embodiment.

Then a the "best" plane that adjust to the sample points e.g., Random Sample Consensus (RANSAC), Support Vector Machines SVM, Least Squares, etc. FIG. 4 shows a plane 50 formed by sampling points $$\hat{\lambda}_{k+1}^k$$

indicated at 52. The sampled points 52 may be collinear. If the sampled points are collinear then the motion between frames will be constrained by a line. This constraint is still valid since it describes a valid motion. When the equation of the plane is found, we get the normal of the plane $\vec{n} \triangleq [a\ b\ c]^T$ and its bias term d. Then the vector $A=[a\ b\ c\ d]^T$. Outliers in the formulation of the plane 50 are discarded by relaxing the constraints $g_k$ such that the optimization problem becomes $$\min_X f(X) + f_0(X) + \mu \sum_{\kappa \in O} \|g_k(X)\|^2_{P^k_{k+1}}. \quad \text{Equation 5}$$

Where μ is a penalty (constant) parameter.

Figure 5:
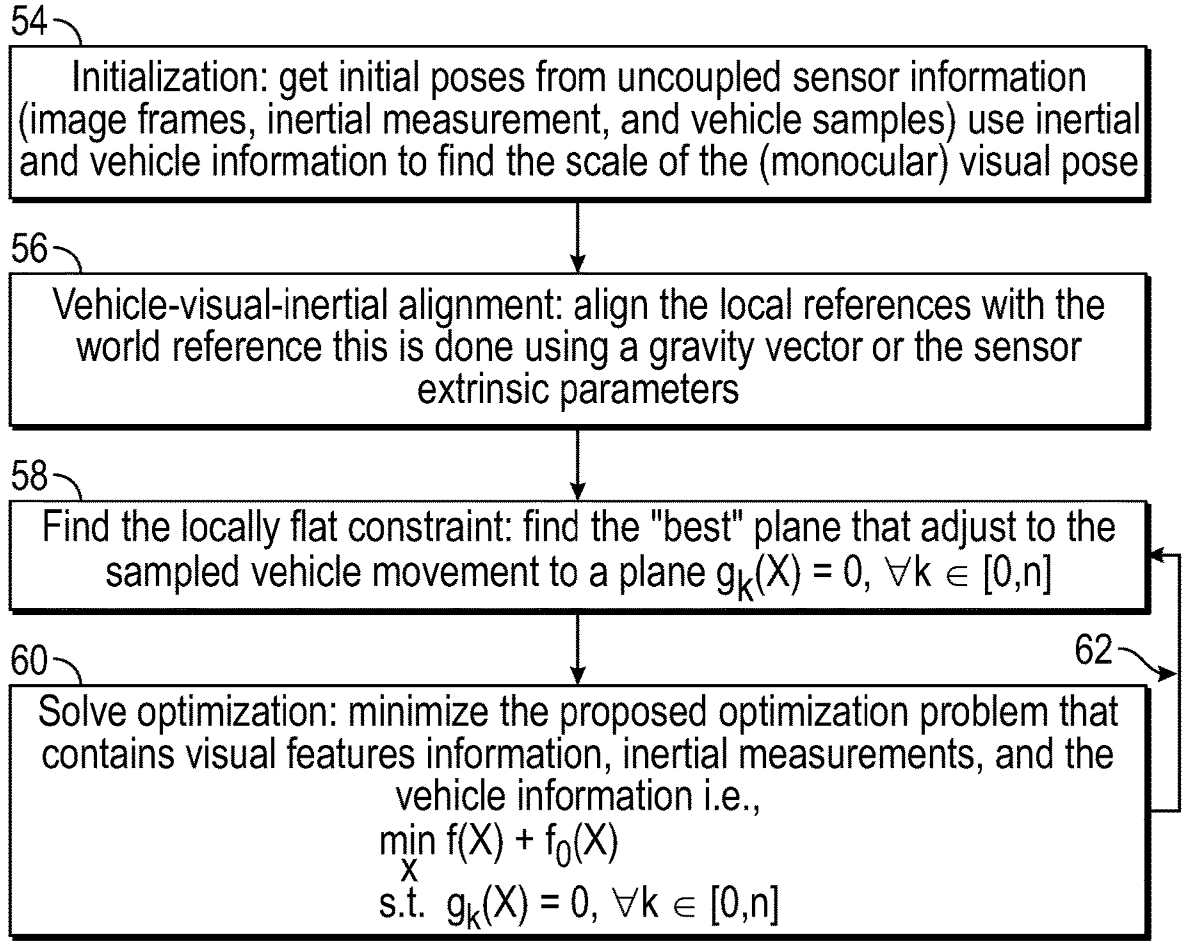
FIG. 5 is a flow diagram of an example disclosed visual-inertial odometry method.

Referring to FIG. 5, a flow diagram is show that outlines one example disclosed method of visual inertial odometry. Beginning with an initialization step indicated at 54, initial image frames, inertial measurement, and vehicle samples are gathered to obtain a first set of poses (i.e., the set of positions and orientations of the vehicle). A pose is a position and orientation of a vehicle in a defined (common) coordinate system. The initialization provides a pose for each type of sensor, i.e., the initialization provides an independent pose using the initial image frames, inertial measurement, and vehicle samples. By using the pose coming from the vehicle information and the inertial measurements, we find the scale of the visual (monocular) pose (notice that a monocular only odometry is up to scale).

Once the initialization is complete, a vehicle visual inertial alignment is performed as indicated at 56. The vehicle visual inertial alignment aligns the uncoupled trajectories coming from the initial poses. Using this alignment, each local coordinate system is aligned with a world coordinate system. The gravity vector is the gravitational acceleration that is measured by the IMU 26. The extrinsic parameters for each sensor is the position and orientation of itself with respect to a common origin in the vehicle.

A locally flat constraint is then determined to adjust the six degrees-of-freedom vehicle movement to a three degrees-of-freedom (movement in a plane) identified by the locally flat constraints.

The solution is continually updated based on the updated visual features, inertial measurements, and vehicle information as is indicated at 60. The optimized solution is then fed back as indicated at 62 to find and adjust the plane as indicated at 58.

Accordingly, the proposed method augments a visual-inertial optimization odometry optimization by including vehicle information (like wheel speed sensors and steering wheel angle) and constraining the solution to be in a common best plane to provide a two-dimensional solution. By constraining the solution to two-dimensions substantial hardware and processing requirements can be eliminated as well as the incorporation of vehicle information brings more robustness to the odometry system and makes it more accurate.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of visual-inertial odometry for a ground vehicle comprising:

obtaining, by a controller comprising a processor, an initial set of images with a camera on-board a vehicle;

identifying, by the controller, visual features within the initial set of images;

determining, by the controller, a three-dimensional pose using the visual features in the initial set of images;

obtaining information indicative of vehicle movement with an inertial measurement unit (IMU) of the vehicle;

obtaining information indicative of vehicle movement with wheel speed sensors and a steering wheel angle sensor;

aligning a local reference planes for each of the IMU, the wheel speed sensors and the steering wheel angle sensor with a world reference plane;

determining a locally flat two-dimensional plane between the three-dimensional pose and subsequent sets of images and information indicative of vehicle movement;

fusing in real-time and continuously, by the controller, the identified features within the images, the vehicle movement information from the IMU, and vehicle movement information from the wheel speed sensors and the steering wheel angle sensors within a two-dimensional plane; and determining, by the controller, a vehicle position relative to an initial start location of the vehicle based on the real-time and continuous fusing of the visual features in the images and the vehicle movement information from the IMU, the wheel speed sensors, and the steering wheel angle sensor;

wherein the fusing comprises determining the two-dimensional plane according to a sliding window based optimization and continually updating the determined locally flat two-dimensional plane based on updated visual features and information from the IMU, wherein the sliding window based optimization is constrained between any two images as a locally flat movement based on the continually updated locally flat two-dimensional plane, the sliding window based optimization being based on a loss function for a vehicle model, the vehicle model modeling movement of the vehicle within a two-dimensional space corresponding to the two-dimensional plane.

2. The method of vehicle-visual-inertial odometry as recited in claim 1, wherein an alignment of images poses is constrained to the two-dimensional plane.

3. The method of vehicle-visual-inertial odometry as recited in claim 2, wherein the fusing comprising fusing, by the controller, vehicle speed information from the wheel speed sensors with the visual features from the camera's images.

4. The method of vehicle-visual-inertial odometry as recited in claim 3, wherein the fusing comprising fusing, by the controller, a steering wheel angle from the steering wheel angle sensor with the visual features from the camera's images.

5. The method of vehicle-visual-inertial odometry as recited in claim 4, wherein the fusing of the poses coming from the identified features is within a common plane between two or more consecutive images.

6. The method of vehicle-visual-inertial odometry as recited in claim 5, wherein vehicle acceleration and orientation data obtained from the IMU is gathered at a rate higher than that of the rate that the camera captures images.

7. The method of vehicle-visual-inertial odometry as recited in claim 6, wherein the poses are transformed to match an IMU reference frame.

8. The method of vehicle-visual-inertial odometry as recited in claim 6, wherein motion between images is constrained to provide a best fit of a plurality of sampled points from the IMU, the wheel speed sensors, and the steering wheel angle sensor.

9. A vehicle-visual-inertial odometry system for a ground vehicle comprising:

at least one camera on-board the vehicle obtaining images of object proximate the vehicle;

an inertial measurement unit (IMU) generating information indicative of vehicle movement;

a wheel speed sensor generating information indicative of wheel speed; and a controller, comprising a processor and memory, configured to obtain an initial set of images with a camera on-board a vehicle, identify visual features within the initial set of images, obtain information indicative of vehicle movement with an inertial measurement unit (IMU), obtain information indicative of vehicle movement with the vehicle's wheel speed sensors and a steering wheel angle sensor, determine a three-dimensional pose using the identified visual features from the initial set of images;

align local reference planes for each of the IMU, the wheel speed sensors and the steering wheel angle sensor with a world reference plane;

determine a locally flat two-dimensional plane between the three-dimensional pose and subsequent sets of images and information indicative of vehicle movement with the visual features in a sliding window and for a plurality of sampled points from the IMU, the vehicle's wheel speed sensors, and the steering wheel angle sensor, fuse in real-time and continuously the identified features within the images and the vehicle movement from the IMU and vehicle sensors within the two-dimensional plane, and determine a vehicle position relative to an initial start location based on the real-time and continuous fusion of the visual features in the images and the vehicle movement information from the IMU and vehicle sensors, wherein the two dimensional plane is determined according to a sliding window based optimization that is continually updated based on updated visual features and information from the IMU and vehicle sensors, wherein the sliding window based optimization is constrained between any two images as locally flat movement based on the continually updated locally flat two-dimensional plane, the sliding window based optimization being based on a loss function for a vehicle model, the vehicle model modeling movement of the vehicle within a two-dimensional space corresponding to the two-dimensional plane.

10. The vehicle-visual-inertial odometry system as recited in claim 9, wherein the controller is further configured to align the poses coming from the visual features in the two-dimensional plane.

11. The vehicle-visual-inertial odometry system as recited in claim 10, further including a wheel speed sensor obtaining information indicative of a vehicle speed and the controller is further configured to fuse the vehicle speed information from the wheel speed sensor with the information coming from the camera's images.

12. The vehicle-visual-inertial odometry system as recited in claim 11, further including a steering angle sensor providing an angle of the steering and the controller is configured to fuse the steering angle with the information coming from the camera's images.

13. The vehicle-visual-inertial odometry system as recited in claim 12, wherein the controller is configured to constrain the solution of the odometry system by the identification of a common plane for the visual features, the IMU, and the vehicle information between two consecutive images.

14. The vehicle-visual-inertial odometry system as recited in claim 13, wherein the controller is configured by a linear constraint to constraint the solution of the odometry system.

15. The method as recited in claim 1, wherein the controller determines the two dimensional plane based upon a linear constraint.

16. The method of vehicle-visual-inertial odometry as recited in claim 1, wherein vehicle measurements are pre-integrated on two consecutive image frames and transformed to an IMU frame, the vehicle measurements comprises vehicle position, vehicle speed and vehicle yaw angle, and the vehicle position, the vehicle speed information from the wheel speed sensors and the vehicle yaw angle are pre-integrated within the sliding window according to the vehicle model.

17. The vehicle-visual-inertial odometry system as recited in claim 9, wherein vehicle measurements are pre-integrated on two consecutive image frames and transformed to an IMU frame, the vehicle measurements comprising vehicle position, vehicle speed and vehicle yaw angle, and the vehicle position, the vehicle speed information from the wheel speed sensors and the vehicle yaw angle are pre-integrated within the sliding window according to the vehicle model.

18. The method of vehicle-visual-inertial odometry as recited in claim 1, further comprising operating the vehicle based at least in part upon the determined vehicle position.

19. The vehicle-visual-inertial odometry system as recited in claim 9, wherein the controller is further configured to operate the vehicle based at least in part upon the determined vehicle position.

* * * * *